US006840721B2

(12) United States Patent
Kaule et al.

(10) Patent No.: US 6,840,721 B2
(45) Date of Patent: Jan. 11, 2005

(54) PROCESS FOR PRODUCING DIES

(76) Inventors: Wittich Kaule, Lindaoher Weg 13, D-82275 Emmering (DE); Karlheinz Mayer, Alfred-Wainald-Weg 12, D-86169 Augsburg (DE)

( * ) Notice: Subject to any disclaimer, the term of this patent is extended or adjusted under 35 U.S.C. 154(b) by 0 days.

(21) Appl. No.: 09/147,398

(22) PCT Filed: Jun. 16, 1997

(86) PCT No.: PCT/EP97/03120

§ 371 (c)(1),
(2), (4) Date: Apr. 2, 1999

(87) PCT Pub. No.: WO97/48555

PCT Pub. Date: Dec. 24, 1997

(65) Prior Publication Data

US 2001/0043842 A1 Nov. 22, 2001

(30) Foreign Application Priority Data

Jun. 17, 1996 (DE) ........................................ 196 24 131

(51) Int. Cl.[7] ............................ B23C 3/00; B41F 1/00; B23Q 15/00; G05B 19/4097; B44B 3/02

(52) U.S. Cl. ......................... 409/132; 409/94; 101/170; 101/150; 358/3.31; 700/183; 700/187; 700/184

(58) Field of Search .............................. 409/85, 93–94, 409/96, 131, 132, 84, 80; 700/161, 184, 183, 187, 166; 101/150, 153, 170; 358/3.31, 3.32, 3.29

(56) References Cited

U.S. PATENT DOCUMENTS

| | | | | | |
|---|---|---|---|---|---|
| 1,719,621 | A | * | 7/1929 | Pearne et al. | 409/80 |
| 2,210,923 | A | * | 8/1940 | Jacquerod et al. | 101/170 |
| 2,638,050 | A | * | 5/1953 | King | 101/170 |
| 3,915,061 | A | * | 10/1975 | Stockman | 409/84 |
| RE28,747 | E | * | 3/1976 | Graboyes | 409/80 |

(List continued on next page.)

FOREIGN PATENT DOCUMENTS

| | | | | | |
|---|---|---|---|---|---|
| JP | 7-230308 | A | * | 8/1995 | |
| JP | 8-282195 | | * | 10/1996 | |
| JP | 8-309953 | A | * | 11/1996 | |
| JP | 10-58282 | A | * | 3/1998 | |
| JP | 2000-263373 | A | * | 9/2000 | |
| JP | 2000-263374 | A | * | 9/2000 | |
| SU | 1537407 | A | * | 1/1990 | 409/138 |

OTHER PUBLICATIONS

Technical Manual, Lang GmbH & Co., KG (Untitled).
Technical Manual, Type 3 Numerical Control.
User Manual, Heidenhain.

*Primary Examiner*—Erica Cadugan
(74) *Attorney, Agent, or Firm*—Bacon & Thomas, PLLC

(57) ABSTRACT

In a method for producing embossing plates, in particular steel intaglio printing plates, a plane element is determined from a line drawing, the edge of the plane element defining a desired contour. A tool track is then calculated from the desired contour and a desired depth associated with the plane element, to be used for guiding an engraving tool such that the partial area is removed.

33 Claims, 7 Drawing Sheets

U.S. PATENT DOCUMENTS

| | | | | | |
|---|---|---|---|---|---|
| 3,975,983 | A | * | 8/1976 | Stockman | 409/126 |
| 4,152,986 | A | * | 5/1979 | Dadowski et al. | 101/170 |
| 4,521,860 | A | * | 6/1985 | Kanematsu et al. | 700/184 |
| 4,621,959 | A | * | 11/1986 | Kishi et al. | 409/84 |
| 4,830,552 | A | * | 5/1989 | Ryf | 409/103 |
| 4,850,761 | A | * | 7/1989 | Breuer et al. | 409/132 |
| 4,907,164 | A | * | 3/1990 | Guyder | 700/173 |
| 4,945,487 | A | * | 7/1990 | Kimura et al. | 407/62 |
| 4,949,270 | A | * | 8/1990 | Shima et al. | 700/184 |
| 4,972,323 | A | * | 11/1990 | Cauwet | 700/184 |
| 5,112,171 | A | * | 5/1992 | Daetwyler | 409/131 |
| 5,164,285 | A | * | 11/1992 | Takakura | 101/150 |
| 5,223,777 | A | * | 6/1993 | Werner et al. | 700/184 |
| 5,246,319 | A | * | 9/1993 | Prince et al. | 409/84 |
| 5,354,961 | A | * | 10/1994 | Diot et al. | 219/69.13 |
| 5,378,091 | A | * | 1/1995 | Nakamura | 279/20 |
| 5,435,247 | A | * | 7/1995 | Giori et al. | 101/401 |
| 5,460,757 | A | * | 10/1995 | Hedgecoth | 264/400 |
| 5,475,914 | A | | 12/1995 | Bornhorst, Jr. et al. | |
| 5,526,272 | A | * | 6/1996 | Kondo et al. | 318/568.1 |
| 5,595,463 | A | * | 1/1997 | Takegahara et al. | 409/132 |
| 5,602,748 | A | * | 2/1997 | Seki et al. | 318/570 |
| 5,609,448 | A | * | 3/1997 | Oohara et al. | 409/80 |
| 6,077,002 | A | * | 6/2000 | Lowe | 409/132 |
| 6,407,361 | B1 | * | 6/2002 | Williams | 219/121.69 |
| 2002/0107607 | A1 | * | 8/2002 | Sakai et al. | 700/182 |

* cited by examiner

PROCESS FOR PRODUCING DIES

BACKGROUND OF THE INVENTION

1. Field of the Invention

This invention relates to a method for producing embossing plates, in particular steel intaglio printing plates.

2. Description of Related Art

For producing embossing plates, in particular steel intaglio printing plates, as are usually employed for printing high-quality printed products such as papers of value, bank notes or the like one has hitherto resorted to having the embossing plates produced in an elaborate method by an artist. A picture motif made available to the artist is converted into a line pattern whereby lines of different width, depth and a different number per unit area represent the gray levels of the original. Using a chisel, the artist brings this motif in time-consuming hand labor into the metal plate, for example steel or copper. The thus produced plates are characterized by their high quality with respect to use in steel intaglio printing. However the possibilities of correction are extremely low for the artist during production of the plate. If this original plate is damaged or lost, no identical plate can be produced since each plate is an individual production.

It is also known to perform the engraving of a printing cylinder by machine. As described in EP 0 076 868 B1 for example, cups are brought into the printing form which represent the gray level value of a master depending on their screen width and engraving depth. Light tones and tone-dependent changes in the master are produced by varying the focal value of the electron beam in the printing form, whereby cups of different volume can arise.

From DE 30 08 176 C2 it is also known to use a laser for engraving a printing cylinder. An original is scanned and the resulting signal used via an analog-to-digital converter for controlling the laser with which engraved cups of defined depth and extension are brought into the printing cylinder.

When the original is broken down into gray-level values represented on the printing plate by cups, the essential components necessary for steel intaglio printing are lost, since this technique is only able to transfer ink to the print carrier point by point. Steel intaglio printing, however, is characterized by the fact that a continuous linear printing pattern tangible with the inking is transferred to the print carrier, characterized in particular by its filigreed design.

SUMMARY OF THE INVENTION

The objective of the invention is accordingly to propose a method permitting simple and automated production of embossing plates, in particular steel intaglio printing plates.

The invention is based on the finding that it is possible to treat a two-dimensional line original graphically such that the existing lines are interpreted as areas. These areas are limited by edges, these edges defining a desired contour of the area. Starting out from this desired contour one determines a tool track along which an engraving tool can be guided such that material is removed within the area limited by the desired contour. The engraving tool is controlled such that the material within the desired contour is removed in the form of continuous or interrupted lines or grooves in a certain depth profile. This depth profile can be determined by a depth value that is constant or varies within the desired contour.

The inventive method preferably makes use of a data processing system which makes it possible to acquire, store and process two-dimensional line originals. The two-dimensional line original, which is for example produced in a computer or read in via input devices, can be processed with the ad of a suitable computer program so as to yield track data for controlling an engraving tool along a tool track. For this purpose one defines in a first working step from the two-dimensional line original a plane element which consists for example of a single line of the line original. The edge enclosing the line then defines a desired contour with is intersection-free. To produce the engraving one associates a depth profile with the interior of the plate element as the desired depth for the engraving, and then calculates from the desired contour data and the associated desired depth a tool track along which the engraving tool is guided and removes material within the plane element in a predetermined, non-random manner.

This procedure is then repeated for each individual plane element to be engraved so that an engraving tool track can be determined for the entire area to be engraved, composed of the sum of the individual plane elements to be engraved.

Using this method one can considerably increase the speed for producing the embossing plate. Furthermore, errors during engraving are excluded by the exact guidance of the engraving tool so that a multiplicity of embossing plates can be produced with the same exactness. In addition the method offers simple possibilities of correction by changing the data of the line drawing. The exact reproducibility of the engraving to be brought in furthermore permits printing plates to be produced directly without any need for a galvanic shaping process. Several engraving tools can thereby also engrave several plates simultaneously. Furthermore several, possibly different, engraving tools can also be controlled such that they process a plate simultaneously, thereby optimizing the processing time.

Further advantages and advantageous embodiments will be explained with reference to the following figures, in which a true-to-scale representation was dispensed with for the sake of clearness.

DETAILED DESCRIPTION OF THE PREFERRED EMBODIMENTS

Figure 1:
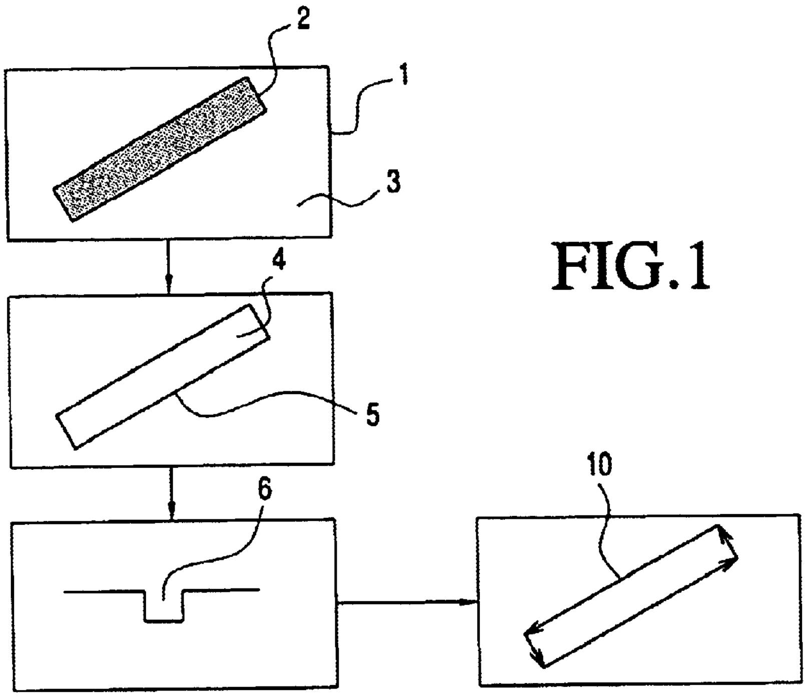
FIG. 1 shows a schematized overall view of the inventive method.

As shown in FIG. 1, the inventive method starts out from two-dimensional line original 1, consisting of simple black line 2 on light background 3 to illustrate the inventive principle. The original, which is present on paper for example, can be digitally acquired in a computer with the aid of a scanner or another suitable data input means. Alternatively it is also possible to produce the line original directly on the computer interactively, using for example a plotting or graphics program, or to have the computer produce certain graphic data by mathematical algorithms. If the original is designed in the latter way, guilloche lines or other graphic elements could be produced for example with the aid of implemented programs which permit interactive input or presetting of data or calculation of the structures with the aid of random algorithms. From line original 1 one defines in a second method step an area, e.g. area 4, which represents a partial area of the plate. The edge of this area defines desired contour 5 which serves as the first of two elements as the starting point for subsequent calculation of a tool track along which the embossing plate is to be engraved. As the second element for calculating the tool track it is necessary to associate a depth profile within the desired contour, which is termed the so-called desired depth. This can be preset constantly for the entire engraving for example. It can also depend on the form of the engraving tool used. From desired depth 6 and desired contour 5 one then calculates tool track 10 located within area 4 along which the engraving tool must be moved so that the engraving corresponding to the line drawing can be brought into the embossing plate.

Since different engraving tools can be used for engraving the plate, it is clear that data of the particular engraving tool also enter into the calculation of the tool track. If a laser beam is used, the width of the beam acting on the embossing plate can be included in the calculation for example. If a mechanical chisel is used, the chisel form, in particular the form of the point or its radius of curvature, is of essential importance for calculating the tool track.

The engraving tool is controlled subsequent to the determination of the tool track such that it moves within area 4, does not hurt desired contour 5 during engraving and removes area 4 at predetermined desired depth 6.

Figures 2A, 2B, 2C:
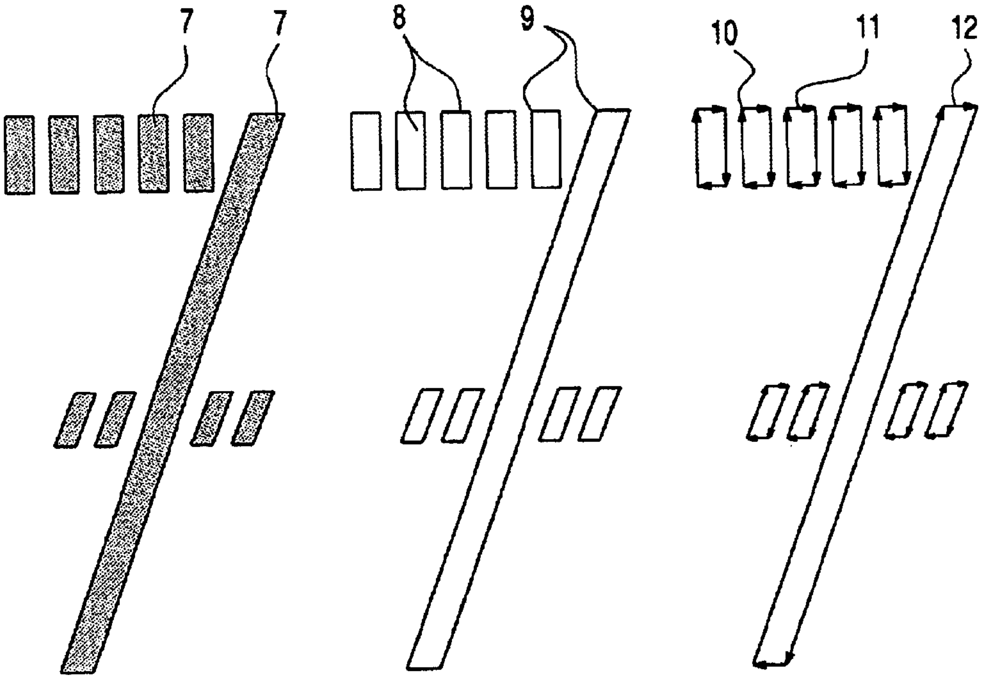
FIG. 2 shows a schematic example of the inventive method.

In a specific embodiment, shown in FIG. 2, the number "7" is produced as a line original on a sheet of paper and read into a computer with the aid of a scanner. The number "7" consists of lines 7, as shown in FIG. 2(*a*). Using the above-described procedure one defines from existing lines 7 areas 8 whose edges form desired contours 9, as shown in FIG. 2(*b*). These serve as a starting point for calculating a tool track. Through the association of a desired depth, which is constant in this case, one can determine with consideration of the particular tool data tool tracks 10, 11 and 12 along which the engraving tool is controlled over the embossing plate so that the line drawing can be transferred to the embossing plate. These tool tracks are shown by way of example in FIG. 2(*c*). Tool tracks 10, 11 and 12 are preferably determined such that the tool is guided along desired contours 9 within areas 8 without hurting the desired contours.

Figure 3A:
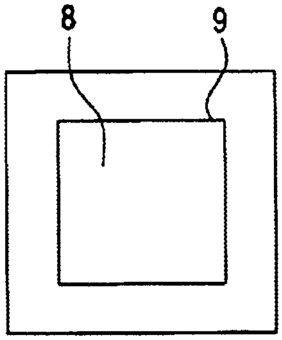
FIG. 3 shows a schematic example of the inventive method.
Figure 3B:
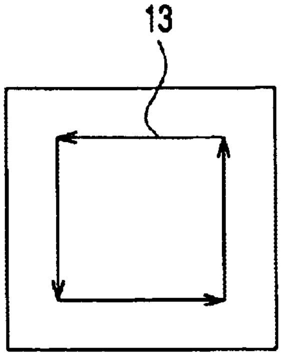

Since the width of the material removed with the engraving tool is limited, one can define via the line drawings plane elements with a size which cannot be removed completely if the engraving tool is guided only along the desired contour lines. A very simple form of line drawing is shown by way of example in FIG. 3. Via the line drawing of FIG. 3(*a*) one defines plane element 8 having contour line 9. When tool track 13 is now calculated on the basis of these given data, as shown in FIG. 3(*b*), the engraving tool cannot in one cycle completely remove the area to be removed, depending on the dimensioning of area 8 and the form of the engraving tool.

Figure 4:
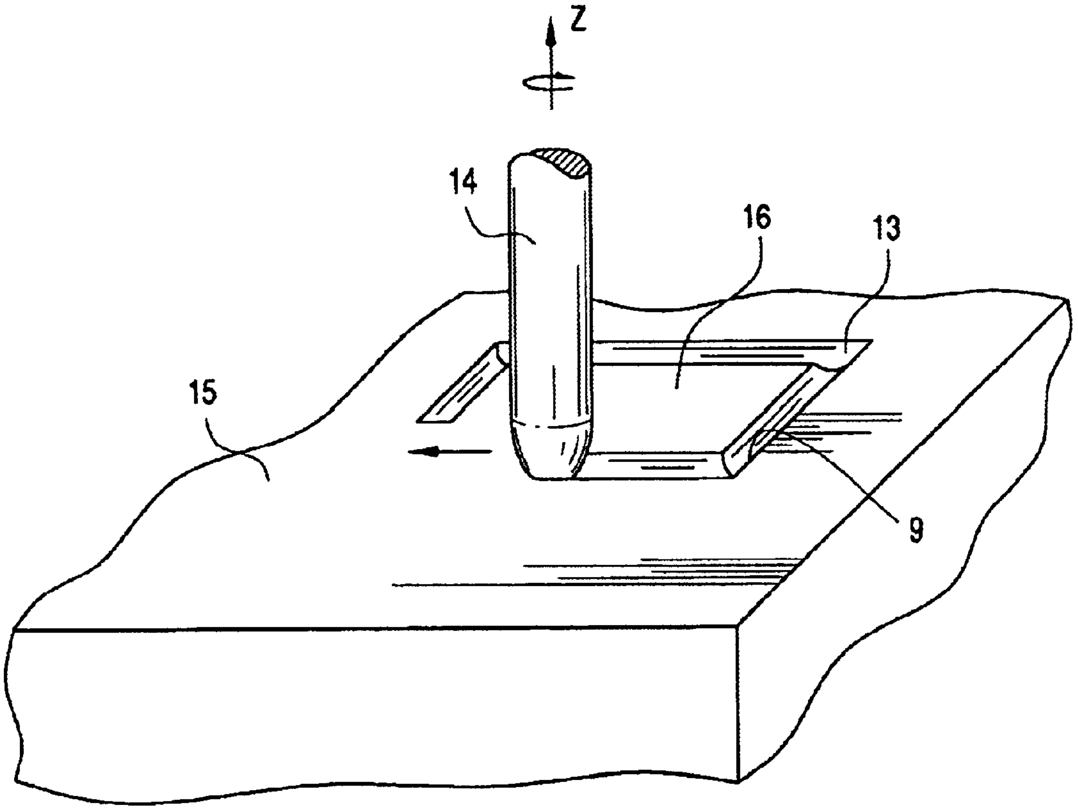
FIG. 4 shows a schematic example of the inventive method.
Figure 12:
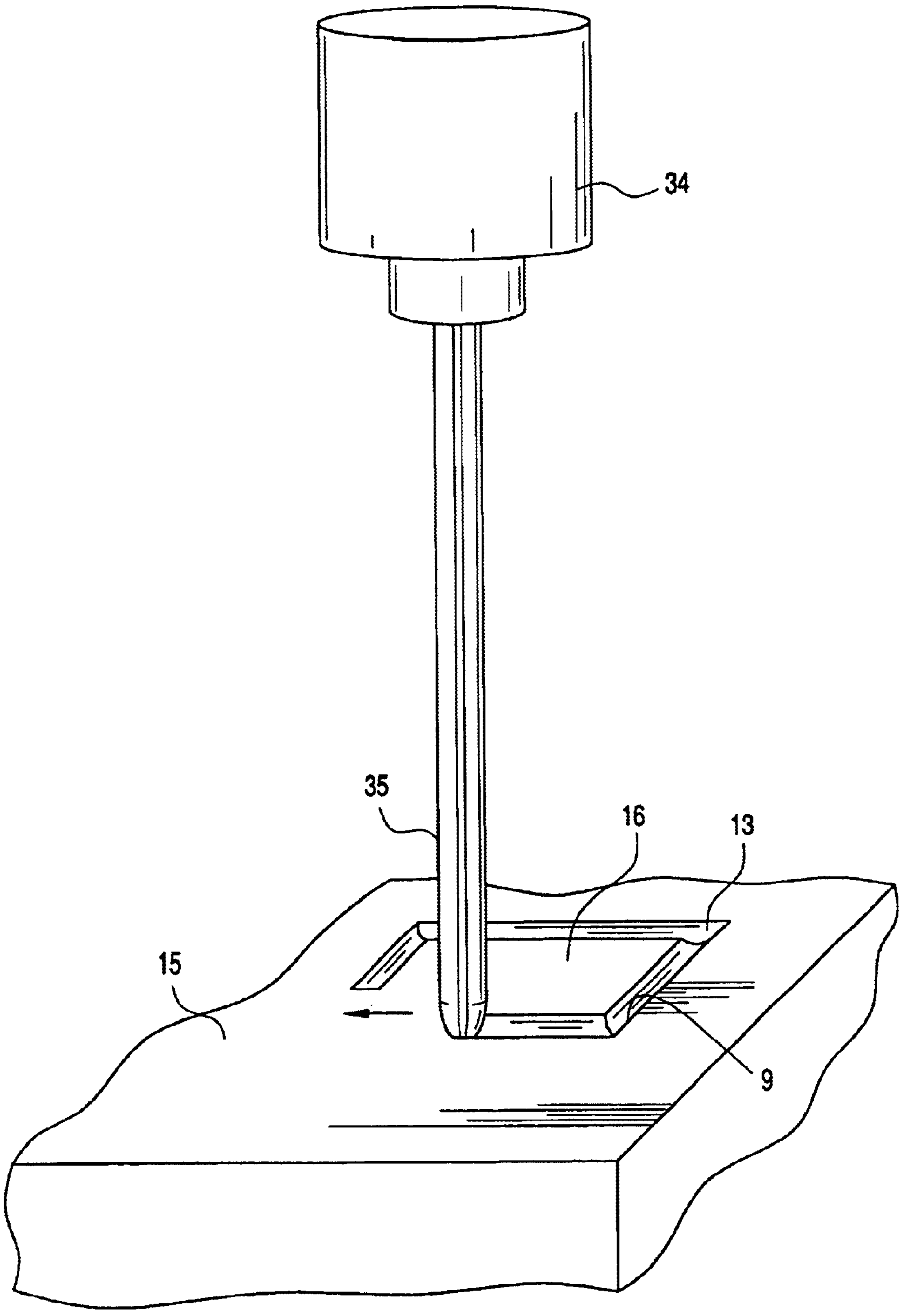
FIG. 12 shows a schematic example of the inventive method with the rotating chisel of FIG. 4 replaced by a laser beam.
Figure 13:
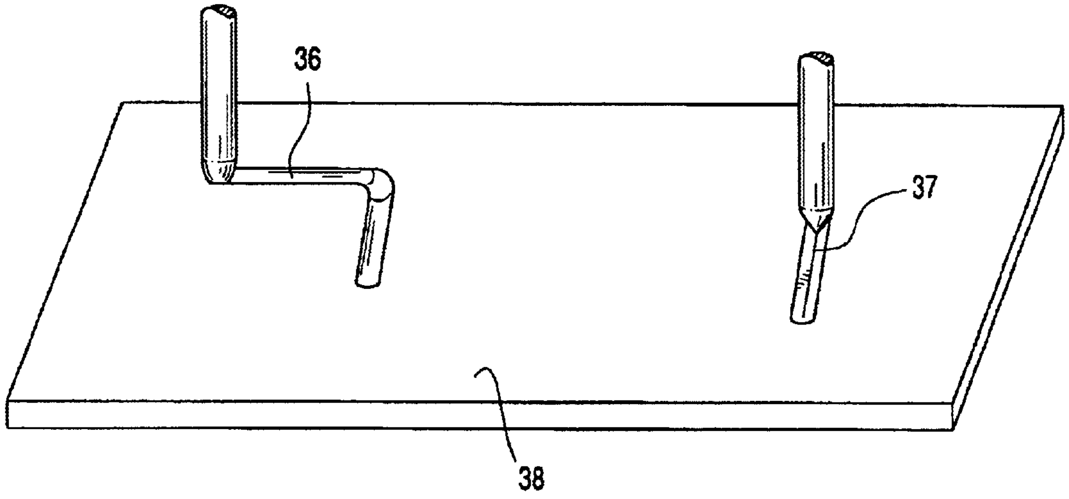
FIG. 13 shows another schematic example of the inventive method, with two rather than one rotating chisels.

For rotating 14 chisel these relations are shown in perspective in FIG. 4. Corresponding relations for a laser beam 35 generated by a laser beam source 34 are shown in FIG. 12, with element common to FIGS. 4 and 12 being numbered identically. For convenience, the following discussion will refer only to chisel 14, but it will be understood that the automation principles described below apply to the laser engraver illustrated in FIG. 12 as well as to the mechanical chisel illustrated in FIG. 4. In addition, it will be understood that the principles described below are applicable the simultaneous use of multiple engraving tools 36 and 37 on a single embossing plate 38, as illustrated in FIG. 13. Chisel 14 rotates about its own axis z and, after penetrating into embossing plate 15, removes material from the embossing plate along tool track 13 at a predetermined depth. Due to the guidance of rotating chisel 14 along tool track 13, desired contour line 9 remains intact. Because of the limited width of the chisel, however, residual area 16 of area 8 to be removed cannot be removed in one cycle of the engraving tool. Only in a further operation can residual area 16 be removed using a second predetermined tool track, which can differ in form from first tool track 13.

Figure 5A:
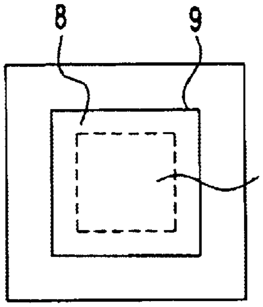
FIG. 5 shows a schematic example of the inventive method.
Figure 5B:
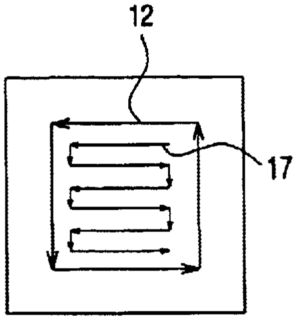
Figure 5C:
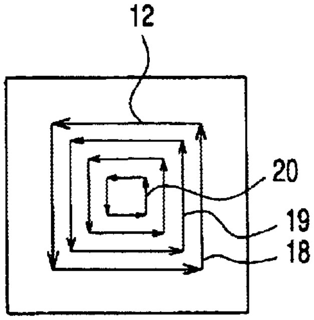

As to be seen in FIG. 5(*a*), it is necessary in this case also to consider residual area 16 not removable in the first step when calculating the tool track for removing area 8. For removing residual area 16 one can determine different tool tracks depending on the desired engraving results. Thus the tool track can, as shown in FIG. 5(*b*), first extend along the desired contour and residual area 16 then be removed in a meander shape, the engraving tool removing the residual area continuously in meander-shaped track 17 within area 16. FIG. 5(*c*) shows a further possibility whereby residual area 16 is removed by guidance of the engraving tool along tool tracks which are similar in the mathematical sense to tool track 12 first calculated, i.e. tool tracks 18, 19 and 20 correspond to tool track 12 in form but have a different dimension from tool track 12. Particularly in the case of curved contour lines, residual area 16 can accordingly be removed using tool tracks which extend contour-parallel, i.e. are equidistant from the contour line at each point.

Figure 6A:
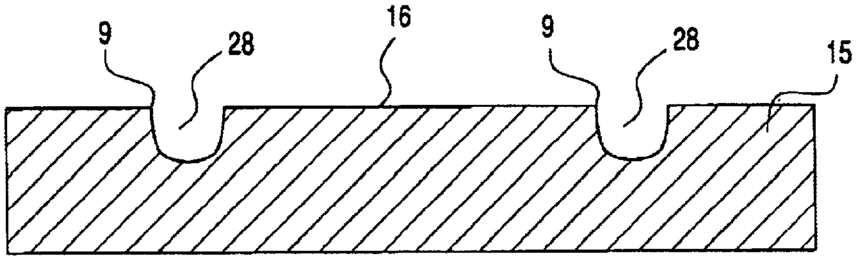
FIG. 6 shows a schematic cross section through an embossing plate.

As to be seen in FIG. 6(*a*) in a cross section through embossing plate 15, one calculated from contour line 9 a tool track along which the engraving tool was guided, thereby producing engraved line 28 enclosing residual area 16 yet to be engraved. To remove residual area 16 one can use any method but preferably one of the above-described. Regardless of the particular method one produces at the base of the residual area engraving a defined roughness structure determined by the offset and form of the engraving tool. FIG. 6(*b*) shows such a roughness structure, whereby a tapered, rotating graver was used for engraving, removing the embossing plate at defined depth T. The chisel used had diameter D on the surface emerging from the embossing plate and was offset inward by the amount d/2 during removal of the residual area, while the offset is ¾ d in the example shown in FIG. 6(*c*). The engraving tool was moved in accordance with the tool tracks shown in FIG. 5(*c*) in both examples.

The described surface structuring at the base of the engraved area has several advantages for producing steel intaglio printing plates. Using steel intaglio printing plates one could hitherto print only limited line widths, due to the fact that the steel intaglio printing ink can only be brought into engravings of the plate which have a certain maximum width. This obstacle is eliminated by the newly proposed engraving since one can now adjust the roughness as a base pattern at the base of the engraving to serve as an ink trap for a steel intaglio printing ink brought in. This ink can thus be held even in very wide engraved lines so that it is now possible for the first time to print wide lines by steel intaglio printing. As shown in FIGS. 6(*b*) and 6(*c*), the roughness of the base can be controlled via the size of the engraving tool offset. Since different offset widths of the chisel can also be considered in the calculation of the tool track, the roughness can be different at the base in different areas of the residual area and thus the engraved line or area be superimposed with an additional modulation of the roughness of the base pattern. It is thus also possible to bring further information into an engraved line solely by selectively producing the roughness of the base pattern.

Figure 7:
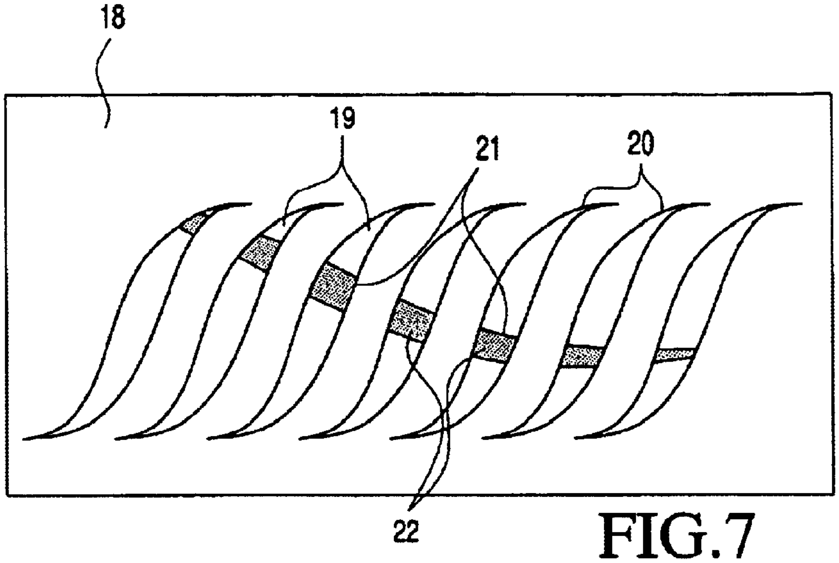
FIG. 7 shows a schematic example of the inventive method.
Figure 8:
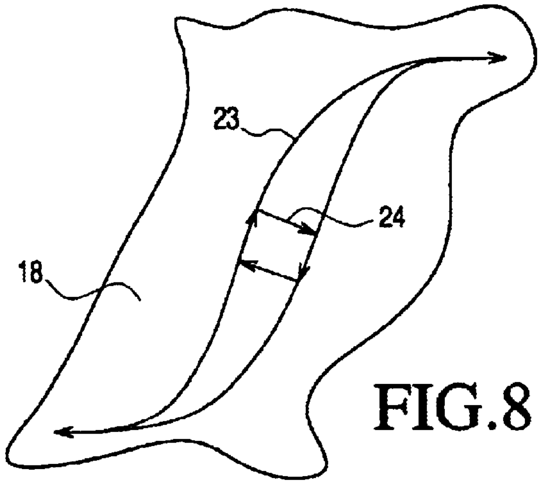
FIG. 8 shows a schematic example of a tool track.

Since transparent inks are usually employed in steel engraving, a different color effect within a line can be produced on the document to be printed with the aid of the different engravings within a line. This color effect can be improved further in particular if the engraving already produced is provided in a further method step with a second engraving whose desired depth has a different definition from that of the first engraving. FIG. 7 shows an example of this in which line drawing 18 with lines 19 is present. Lines 19 are limited by desired contour lines 20. Within lines 19 there are areas 21 limited in turn by second desired contour lines 22. This line original is brought into a computer as a digital data image or produced directly therein. As shown in a detail in FIG. 8, one calculates from contour lines 20, together with a desired depth firmly preset in this case, tool track 23 along which a first engraving takes place. Any remaining residual area is removed at a given desired depth, as described above. Area 21 located within line drawing 19 is converted into tool track 24 in the same way, the contour of area 21 and a second desired depth different from the first being included in the determination of the tool track as a basis for conversion. One can thus produce engravings containing additional information even over a large surface area, which can be transferred to the document at the same time by the steel intaglio printing process.

The tapered edges of line drawing 19 can be rendered exactly by a suitable choice of chisel form. It is possible to use a single fine chisel for the engraving, or rework the tapered edges with a fine chisel after engraving the area with a coarse chisel. As an alternative to this possibility one can also adapt the depth profile to the requirements of area 19 to be engraved. In this case the depth profile is preset such that the engraving tool removes less material at the tapered edges so that, in particular if a rotating mechanical chisel is used, the chisel emerges ever further out of the material to be processed and due to the conic form therefore the removed line becomes narrower. These two techniques can also be used for exact engraving of corners or edges.

For determining the tool track one generally combines a determined desired contour with an engraving depth profile according to the inventive method, thus determining from these two data a tool track along which the engraving tool is guided, so that the material can be removed in accordance with the line drawing at the depth corresponding to the depth profile. The depth profile, i.e. the desired depth, can be preset for each individual engraved line or for the engraving altogether as a constant. Desired depths can also be different for individual engraved lines or parts of engraved lines, so that the particular tool track is accordingly modulated. In addition it is possible to use different engraving tools of like or different kinds in successive method steps in order to produce the desired engraving result. If rotating mechanical chisels are used it is especially advantageous to use different chisel points, forms and sizes, so that optimal embossing plates can be produced in this way.

Figure 9A:
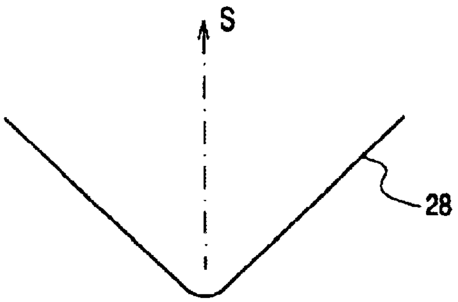
FIG. 9 schematically shows two tool point forms.
Figure 9B:
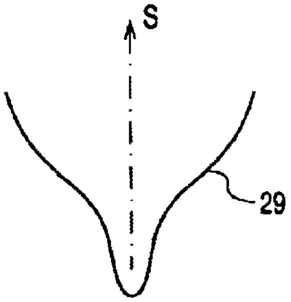

By producing and using different chisel forms and sizes one can influence the embossing result in a variety of ways. Precisely the form and size of the embossing tool determine the form of the thus produced engraving cross-sectional area, depending on the penetration depth of the engraving tool into the plate. FIG. 9 shows two examples of possible cross-sectional areas of chisel points. In FIG. 9(*a*) the chisel point is formed so that intersecting line 28 of the envelope of the cone forms a 45° angle with axis of rotational symmetry S of the engraving tool. Engraving the plate with this tool thus results in an engraving track whose side walls likewise run to the base of the engraving at a 45° angle. This example shows that different wall inclinations can be produced in the engraving plate by producing gravers with different angles. Along with the wall gradient one can also influence the wall form via the forming of the engraving tool. FIG. 9(*b*) shows in this connection cross-sectional line 29 of a rotationally symmetric engraving point with which different angular degrees of the engraving walls can be produced at different engraving depths. These two examples indicate that the use of different engraving tools considerably influences the desired engraving result, and optimal results can be achieved for a certain line original with the aid of specially produced engraving tools or engraving tool points. In particular it is possible to produce the engraving tools in their angle and form so that they can remove even very fine areas to be engraved, whereby in the case of fine lines the tool track along which the engraving tool is guided leads along the predetermined line only once within the area to be removed. Due to the special form of the engraving tool, the material within the desired contour is thus removed by a single working traverse of the graver. In these cases, the tool track can also lead along a center line located between two desired contour lines and equidistant from the two. A suitable chisel form must then be selected at a given depth profile.

The inventive method offers the crucial advantage that engraving can be performed with exact line control even with extremely small engraving areas or lines. The desired depths which can be reached with the inventive method are preferably between 10 and 150 microns, whereby the desired depths can also be preset by different gray-level values of the line original.

If the original is formed for example by a uniform line pattern, e.g. a guilloche, one can bring in visible information, for example a portrait, by varying the line depth, line width, line density or contour by the method described above. Instead of visually recognizable information, however, one can also bring in different, for example machine-readable, information in this way.

Figure 6B:
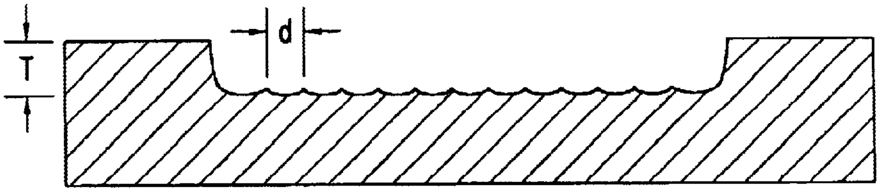
Figure 6C:
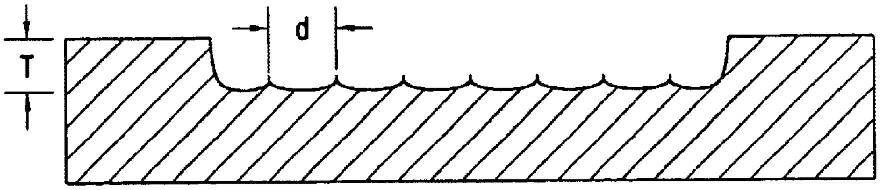
Figure 10:
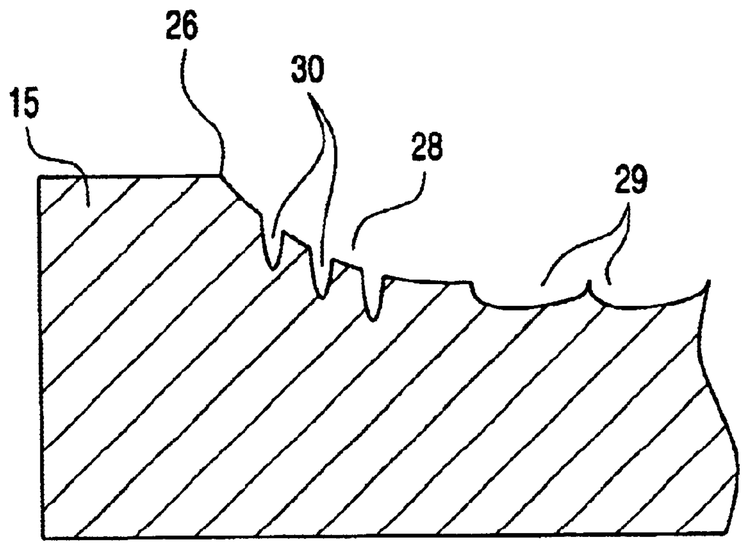
FIG. 10 shows a schematic cross section through an embossing plate.

Although the use of different engraving tools already provides a wealth of possibilities for bringing into the embossing plate substructures in the form of defined roughness structures at the base of the engraving, as shown in FIGS. 6*b* and 6*c,* or additional information resulting from the second engraving described above and illustrated in FIGS. 7 and 8, which can be called micro-engraving in the present case, the inventive method can of course also be used to modify the flanks of the engraving along the desired contours. FIG. 10 shows an example of bringing micro-engraving into the flanks of the depression shown, for example, in FIGS. 6*b* and 6*c,* whereby an engraving consisting in the present case of flank 28 and engraving 29 located on the bottom of the depression is brought into embossing plate 15 and, in an additional operation, additional information in the form of so-called micro-engraving or microstructure lines 30 was brought into flank 28. The flank of the engraved line, like the bottom of the engraved lines as described above in connection with FIGS. 7 and 8, can thus be provided with an additional information content which can consist for example of simple lines, a step function, characters, patterns, pictures or the like. In particulars in the case of gently sloping flanks 28 it is therefore also possible to bring additional information into the flank of an engraved line which extends downward from desired contour line 26.

Figure 11:
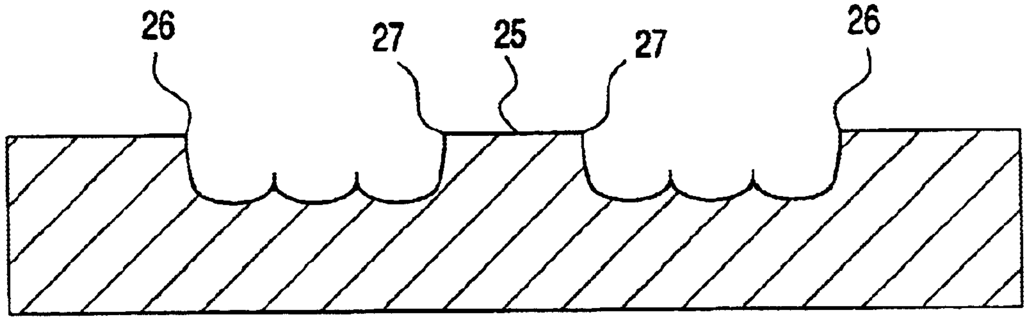
FIG. 11 shows a schematic cross section through an embossing plate.

The inventive method can of course also be employed if a negative image of the line original is to be produced. As shown in FIG. 11, the above-described calculation of the tool track can also be performed if further surface area 25 to be excluded from removal is located within the area to be removed. The tool track is preferably calculated so that the engraving tool runs down the workpiece, i.e. the embossing plate, in a first step such that the embossing plate is removed along desired contour line 26. In a further step, the engraving tool is guided along second desired contour 27 while a residual area possibly remaining between desired contours 26 and 27 is cleared out, as described above.

What is claimed is:

1. A method for producing an intaglio printing plate having a flat top surface with at least one depression in the form of a line brought into the surface of the intaglio printing plate and arranged to be filled with printing ink during intaglio printing, comprising the steps of:

providing a two-dimensional line original;

defining from the two-dimensional line original a line to be brought into the surface of the intaglio printing plate, said line defining a limited partial area, an edge of the limited partial area defining a desired contour;

associating a depth profile, selected based on the amount of printing ink to be used in printing, within the desired contour;

calculating track data with aid of a computer program for controlling movement of an engraving tool along a tool track to be followed by the engraving tool within the desired contour based on the desired contour and the predetermined desired depth profile; and controlling the movement of the engraving tool along said tool track according to said track data such that a material of the surface of the intaglio printing plate is removed within the desired contour along the predetermined desired depth profile to form said at least one depression, said tool track being continuous.

2. The method of claim 1, characterized in that at least part of the tool track extends contour-parallel to the desired contour.

3. The method of claim 1, characterized in that the desired depth is variable with the tool track.

4. The method of claim 1, characterized in that the desired depth is constant within the tool track.

5. The method of claim 1, characterized in that the material is removed along the tool track within the desired contour by a single working traverse of the engraving tool.

6. The method of claim 1, characterized in that an unengraved residual area located within the partial area is removed along a second tool track.

7. The method of claim 6, characterized in that the residual area is removed by controlling the engraving tool such that said tool removes a surface of the residual area in tracks which are similar or contour-parallel to the desired contour.

8. The method of claim 6, characterized in that the residual area is removed by controlling the engraving tool such that a surface of the residual area is removed in a meander shape.

9. The method of claim 6, characterized in that the unengraved residual area is removed such that a new surface of defined roughness arises at a base of an engraving resulting from removal of the unengraved residual area.

10. The method of claim 9, characterized in that the engraving tool is controlled such that the roughness is executed in the form of grooves.

11. The method of claim 1, characterized in that at least part of the partial area from which material is removed at a predetermined depth is deepened further in at least one further engraving step.

12. The method of claim 11, characterized in that the at least one further engraving step produces humanly recognizable or machine-readable information.

13. The method of claim 11, characterized in that the at least one further engraving step is executed with a finer engraving tool than the engraving tool used to remove said partial area within the desired contour.

14. The method of claim 13, characterized in that the at least one further engraving step is performed in a flank sloping from the desired contour.

15. The method of claim 1, characterized in that the desired contour is defined with the aid of a data processing system.

16. The method of claim 1, characterized in that the engraving tool is a laser beam.

17. The method of claim 1, characterized in that the engraving tool is a mechanical chisel.

18. The method of claim 17, characterized in that the mechanical chisel rotates during engraving.

19. The method of claim 1, characterized in that characterized in that engraving tools of different kinds or dimensions are used for producing the intaglio printing plate.

20. The method of claim 1, characterized in that said plate is engraved with multiple engraving tools simultaneously.

21. The method of claim 1, characterized in that the intaglio printing plate is a steel intaglio printing plate.

22. The method of claim 1, further comprising taking into account the width of said tool before forming said desired contour.

23. The method of claim 1, further comprising forming a second depression to define a second desired contour and a second limited partial area in said limited partial area; moving the engraving tool along a second tool track in said second limited partial area at a second penetration depth; and taking into account the width of said tool before forming said desired contour and said second desired contour.

24. The method of claim 1, further comprising the forming of a second depression to define a second desired contour and a second limited partial area in said limited partial area, said tool track in said second limited partial area being a second penetration depth.

25. An intaglio printing plate having a surface with at least one engraved depression in the form of a line, said at least one depression being arranged to be filled with printing ink during intaglio printing, said at least one depression having flanks, a bottom, and an engraved defined roughness structure at a bottom of the at least one depression, wherein said defined roughness structure has a predetermined meander-shape or extends at least in partial areas in a predetermined direction parallel to a direction of said at least one line.

26. The embossing or intaglio printing plate of claim 25, characterized in that the at least one depression further comprises micro-engraving that represents information.

27. The embossing or printing plate of claim 26, characterized in that the micro-engraving is incorporated in the form of characters, pictures, or patterns.

28. The embossing or intaglio printing plate of claim 26, characterized in that said information extends over multiple depressions.

29. The embossing or intaglio printing plate of claim 25, characterized in that the defined roughness structure represents machine readable information.

30. The embossing or intaglio printing plate of claim 25, characterized in that the defined roughness structure is executed in the form of grooves.

31. The embossing or intaglio printing plate of claim 25, characterized in that the defined roughness structure is brought in with the aid of a laser beam.

32. The embossing or intaglio printing plate of claim 25, characterized in that the defined roughness structure is brought in with a mechanical chisel.

33. A method for producing an intaglio printing plate having a flat top surface with at least one depression in the form of a line brought into the surface of the intaglio printing plate and arranged to be filled with printing ink during intaglio printing, comprising the steps of:

providing a two-dimensional line original;

defining from the two-dimensional line original a line to be brought into the surface of the intaglio printing plate, said line defining a limited partial area, an edge of the limited partial area defining a desired contour;

associating a depth profile, selected based on the amount of printing ink to be used in printing, within the desired contour;

calculating track data with aid of a computer program for controlling movement of an engraving tool along a tool track to be followed by the engraving tool within the desired contour based on the desired contour and the predetermined desired depth profile; and controlling the movement of the engraving tool along said tool track according to said track data such that a material of the surface of the intaglio printing plate is removed within the desired contour along the predetermined desired depth profile to form said at least one depression, said tool track being continuous and extending along the desired contour;

and removing an unengraved residual area located within the partial area long said tool track.

* * * * *

UNITED STATES PATENT AND TRADEMARK OFFICE

CERTIFICATE OF CORRECTION

PATENT NO. : 6,840,721 B2
APPLICATION NO. : 09/147398
DATED : January 11, 2005
INVENTOR(S) : Wittich Kaule et al.

It is certified that error appears in the above-identified patent and that said Letters Patent is hereby corrected as shown below:

Column 8:
In claim 24, line 4, insert --at-- after "being".

Signed and Sealed this

Sixth Day of November, 2007

JON W. DUDAS
*Director of the United States Patent and Trademark Office*